Aug. 12, 1924.  1,504,341
C. C. HANSEN
AIR LINE OILER
Filed Nov. 17, 1923
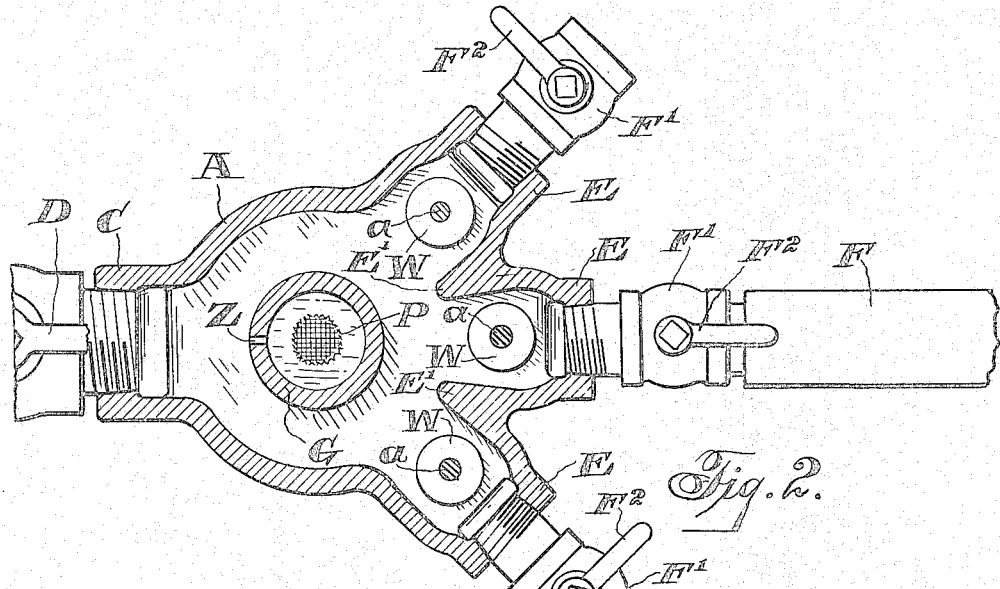
Fig. 2.
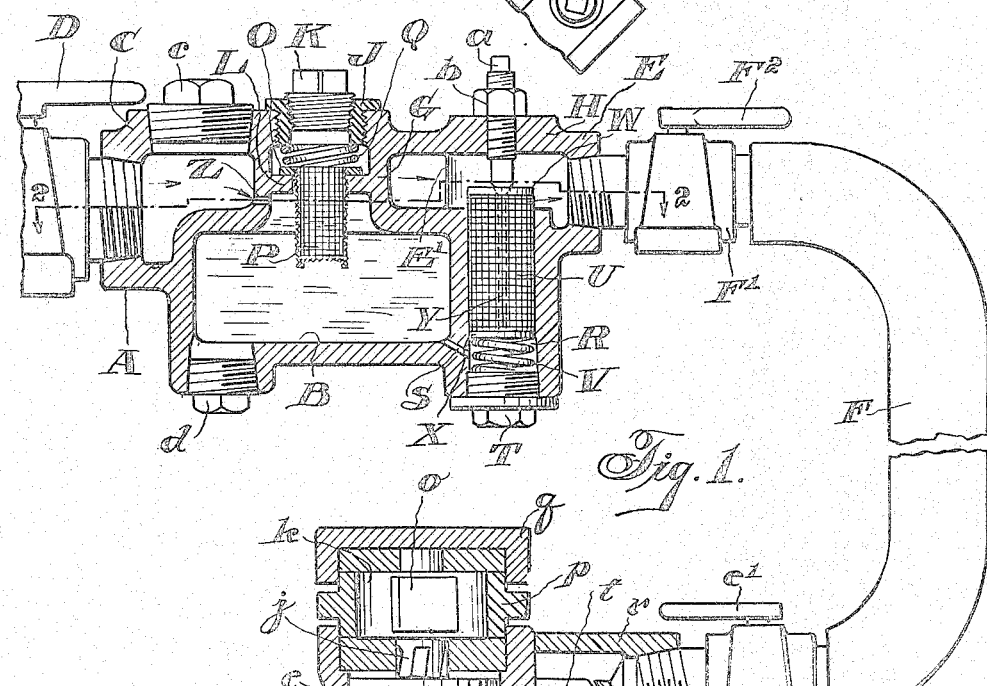
Fig. 1.
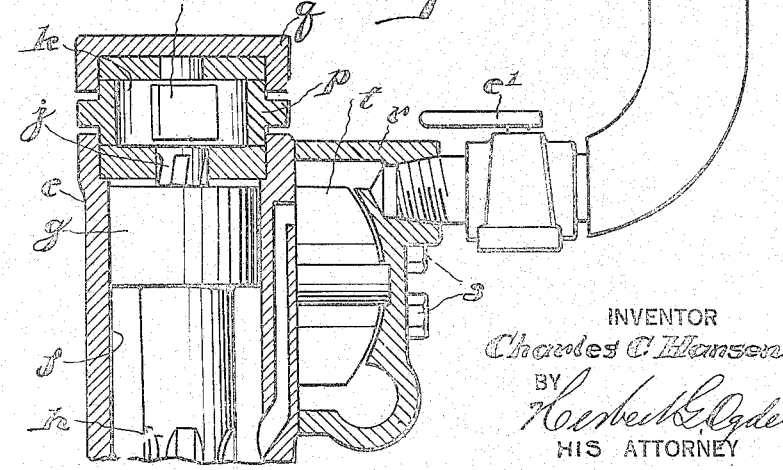
INVENTOR
Charles C. Hansen
BY
Herbert G. Ogden
HIS ATTORNEY Patented Aug. 12, 1924.

1,504,341

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

AIR-LINE OILER.

Application filed November 17, 1923. Serial No. 675,491.

*To all whom it may concern:*

Be it known that I, CHARLES C. HANSEN, a citizen of the United States, and a resident of Easton, Northampton County, and State of Pennsylvania, have invented a certain Air-Line Oiler, of which the following is a specification, accompanied by drawings.

This invention relates to air line oilers, but more particularly to an oiler adapted to be connected to an air line for conveying lubricant to fluid actuated machines such as rock drills, grinders, rotary drills or similar tools.

Rock drills and pneumatic tools such as riveters and rotary drills require constant lubrication in order to obtain a maximum amount of work, and to maintain the machine in running condition for an extended length of time. Lubrication is an especially important problem with rock drills which are used underground in mines because the miners often neglect to lubricate their drills or they are required to travel a considerable distance for lubricant when their machines run dry. One of the reasons for the loss of lubricant is that the water which is used in most drills for cleansing the drilled hole often backs up into the operative parts of the drill and washes away the lubricant and within a short period of time the drill refuses to operate.

Rock drills are usually provided with a lubricant reservoir which must be periodically filled with lubricant but this is somewhat unsatisfactory for the reason that dirt and grit often enters these reservoirs, or the miners forget to fill the reservoirs upon starting work. It has been proposed to carry lubricant to these drills through the medium of the motive fluid supply but the objection to this method has been the fact that either too much lubricant is carried with the air so as to materially affect the efficient running of the machine or on the other hand insufficient lubricant is carried and the machines likewise suffer on this account.

In accordance with the present invention, the above difficulties have been overcome by an air line oiler or lubricator which has been found to carry sufficient lubricant for the efficient operation of the machines. By means of this invention, drills may be kept running for any extended period of time, and the miner does not have to bother with the lubricating of his drill, because this is automatically taken care of in the air line, and as soon as he manipulates the throttle to admit motive fluid to his drill, lubricant is carried by this fluid to all of the operative parts of the machine.

One object of the present invention is to enable fluid actuated machines such as rock drills and pneumatic tools to receive adequate lubrication through the medium of the motive fluid supplied to the machine.

Another object of the present invention is to produce an air line oiler which enables air passing through the oiler to carry away a predetermined amount of lubricant.

A further object of the invention is to produce an air line oiler having a member which is adapted to be saturated with lubricant and which the fluid passing thereover tends to dry.

Further objects of the invention will hereinafter appear and the invention is shown in one of its preferred embodiments in the accompanying drawings, in which—

Figure 1 is a vertical sectional view of an air line oiler and a portion of a rock drill connected together by a suitable hose line, and Figure 2 is a horizontal sectional view taken on line 2—2 of Figure 1, looking in the direction of the arrows.

Referring to the drawings, A designates the casing of an air line oiler with which a lubricant reservoir B is in this instance integrally formed. The casing A is preferably formed with a hollow boss C through which air passes into the casing from an air line which is controlled by a suitable throttle valve D. Air from the air line is adapted to pass through the casing A and out through hollow bosses E preferably formed on the casing. Suitable valve casings F' having valves $F^2$ are preferably connected to the bosses E and hose lines F are adapted to be attached to the valve casings for conveying motive fluid wherever desired. Any suitable number of bosses may be provided according to the number of hose lines desired, and if there are more bosses than hose lines desired, some of the valves $F^2$ may be closed.

In order to provide a filling opening for supplying lubricant to the reservoir B an annular connecting wall G is in this instance formed integrally with the reservoir and the top H of the casing A. A reducing bushing J is preferably threaded into the top H and a plug K in the bushing J closes the filling opening. An internal annular flange L in the wall G provides a seat for the head O of a filter screen P. A coil spring Q in this instance bears against the head O of the filter screen at one end and the bushing J at the opposite end for holding the screen securely in position.

A recess R is preferably formed in each of the bosses E and each recess communicates with the reservoir B through a small port S. A plug T preferably closes one end of each recess R and the opposite end of the recess opens into the casing A. A plug or cartridge U preferably composed of wire gauze and absorbent material, such as felt, wound together is located in each recess R and in this instance is adapted to be forced upwardly by a coil spring V which bears against the inner end of the plug U at one end and the closure plug T at the opposite end. The ends of the cartridge U are preferably closed by washers W and X and a bolt Y passes through the washers W and X and the center of the cartridge. In order to create a pressure on the lubricant in the reservoir B, a port Z in the annular wall G forms a communication between the casing A and the inside of the reservoir. Pressure thus created in the reservoir forces the lubricant from the reservoir B through the port S into the recess R. The absorbent material in the plugs U will constantly become saturated with lubricant from the reservoir and as the air passes through the casing A and over the exposed portion of the plugs U, the air will tend to dry the lubricant from the plugs and carry this lubricant along with it through the hose lines F. A partition or web E' preferably separates the recesses R from each other so that when no air passes through the bosses E, dead spaces are created around these absorbent cartridges U, but when some of the valves F² are open and others closed, the cartridges in the open passages will serve to supply lubricant to the air current passing from the casing, but those cartridges in the dead spaces will be inactive, because air currents are prevented by the webs E', so that no lubricant will be wasted.

In order to adjust the position of the plug U in the recess R and vary the amount of surface exposed to the air passing through the casing, a set screw $a$ is preferably threaded in the top H of the casing A and bears against the washer W, so that by adjusting the position of the set screw $a$ against the spring V, the position of the plug U in the recess R may be varied. A lock nut $b$ on the set screw $a$ enables the set screw to be locked in the desired position of adjustment. By screwing down on the set screw $a$ the plug U will be moved into the recess R against the resistance of the coil spring V and the surface exposed to the current of air passing through the casing will be reduced, and by unscrewing the set screw $a$ the surface exposed to the air current will be increased and more lubricant will be carried away by the air. In this manner the amount of lubricant carried by the air current can be readily varied. A plug $c$ is in this instance threaded into an aperture in the top of the casing A, and if desired, the throttle D for the air line may be connected in said aperture instead of the plug $c$. A plug $d$ in the reservoir B permits access to the interior of the reservoir.

For purposes of illustration, a rock drill $e$ is shown connected to one of the hose lines F, the admission of motive fluid thereto being controlled by a suitable throttle valve $e'$, and in this instance the rock drill comprises a cylinder $f$, in which a piston $g$ having a forward fluted extension $h$ is adapted to reciprocate. A rifle bar $j$ extends into the piston $g$ and is provided with a head $k$ carrying the pawls $o$ which cooperate with a ratchet ring $p$ for imparting rotation to the piston $g$. A back head $q$ is secured to the cylinder $f$ by the usual side rods and a valve chest $r$ is connected to the cylinder $g$ by the bolts $s$. A motive fluid distributing valve $t$ of the butterfly type, is located in the valve chest $r$. As motive fluid passes from the air line through the casing A it tends to dry the plug U, and carries lubricant through the hose line F to the rock drill $e$ and thus lubricates the valve $t$, piston $g$ and other working parts of the drill. Although a rock drill is shown for the purpose of illustration, it is to be understood that the above described air line oiler may be used in connection with any type of machine which is operated by pressure fluid, such as compressed air. Any suitable number of hose line connections may be provided in the casing A to accommodate as many fluid actuated machines as desired, and each machine will receive sufficient lubrication by means of the air current to obtain efficient working of the machine.

I claim:

1. An air line oiler comprising a casing having a passage in its upper portion through which an air current is adapted to pass, a cartridge chamber in the casing, an absorbent cartridge in said chamber, a reservoir for lubricant in the lower portion of the casing subject to the air pressure in said upper passage for supplying lubricant to said cartridge chamber and cartridge and means for exposing the upper portion of said cartridge to the air current passing through the passage in the upper portion of the casing whereby said current tends to dry the exposed portion of said cartridge and carries away small particles of lubricant.

2. An air line oiler comprising a casing adapted to be connected to an air line, a cartridge chamber in said casing, an absorbent cartridge in said chamber, an oil reservoir in the lower portion of said casing subject to the air pressure in said upper passage adapted to supply lubricant to said cartridge chamber and cartridge, and means for adjusting the position of said cartridge in said chamber to expose a greater or less portion of the upper end surface to the air passing through the passage in the upper portion of said casing whereby the air tends to dry the exposed portion of said cartridge and carries away small particles of lubricant through the air line.

3. An air line oiler comprising a casing adapted to be connected to an air line, a cartridge chamber in the casing, a cartridge in said chamber composed of absorbent material and foraminous material, a reservoir for lubricant in the lower portion of the casing subject to the air pressure in said upper passage for supplying lubricant to said cartridge chamber and cartridge and adjusting means for exposing a greater or less portion of the upper end of said cartridge to the air current passing through said casing whereby the air tends to dry the exposed portion of said cartridge and carries away lubricant as it passes from said casing.

4. An air line oiler comprising a casing adapted to be connected to an air line, bosses on said casing to which hose lines are adapted to be connected, absorbent cartridges in said casing adjacent said bosses, means for supplying lubricant to said cartridges and means for adjusting the position of said cartridges for exposing a greater or less surface to an air current passing through said casing whereby the air current carries a greater or less amount of lubricant from said casing.

5. An air line oiler comprising a casing adapted to be connected to an air line, an oil reservoir in said casing, a hollow boss carried by said casing through which an air current is adapted to pass from the casing, a cartridge in said boss adapted to receive lubricant from said reservoir, whereby the air passing through said casing tends to dry said cartridge, and means for adjusting the position of said cartridge to vary the surface exposed to the air current and thereby regulate the amount of lubricant carried away by the air.

6. An air line oiler comprising a casing adapted to be connected to an air line, a reservoir in said casing, means for supplying lubricant to said reservoir, means for admitting air to said casing, hollow bosses through which air is adapted to pass from said casing, an absorbent cartridge in each of said bosses adapted to be impregnated with lubricant from said reservoir, and means for adjusting the position of said cartridge relative to the air current passing through said casing for regulating the amount of lubricant carried away by the air.

7. An air line oiler comprising a casing adapted to be connected to an air line, a lubricant reservoir in said casing, means for supplying lubricant to said reservoir, means for admitting air to said casing, outwardly extending hollow bosses on said casing through which air is adapted to pass from said casing, a cartridge composed of wire gauze and absorbent material wound together in each of said bosses adapted to be impregnated with lubricant from said reservoir, and means for exposing a portion of said cartridge to the air current passing through the casing.

8. An air line oiler comprising a casing adapted to be connected to an air line, a lubricant reservoir in said casing, means for creating a pressure on the lubricant in said reservoir, outwardly extending hollow bosses formed on said casing through which air is adapted to pass from the casing, a cartridge of absorbent material in each of said bosses, the upper portion of said cartridge adapted to extend into the air passage, and the lower portion in communication with said reservoir, spring means for forcing said plug into the air passsage, and means in said casing for adjusting the position of said cartridge to vary the amount of surface exposed to the air current, whereby the amount of lubricant carried away by the air may be regulated.

9. An air line oiler comprising a casing adapted to be connected to an air line, a lubricant reservoir in said casing, means for admitting air to said casing, outwardly extending hollow bosses on said casing through which air is adapted to pass from said casing, manually operable means for preventing air from passing through said bosses, a recess in each of said bosses in communication with said reservoir, the pressure in said reservoir being substantially the same in the normal operation of the device as that of the air passing through said casing, an absorbent cartridge in each of said recesses adapted to be saturated with lubricant from said reservoir, and partitions separating said recesses from each other for preventing an air current around the respective cartridges when certain of said bosses are closed.

10. An air line oiler comprising a casing adapted to be connected to an air line, a lubricant reservoir in said casing, means for admitting air to said casing, outwardly extending hollow bosses on said casing through which air is adapted to pass from said casing, manually operable means for preventing air from passing through said bosses, a recess in each of said bosses in communication with said reservoir, the pressure in said reservoir being substantially the same in the normal operation of the device as that of the air passing through said casing, an absorbent cartridge in each of said recesses adapted to be saturated with lubricant from said reservoir, adjustable means for exposing a portion of each of said cartridges to the air current passing through the casing, and partitions separating said recesses from each other for preventing an air current around the respective cartridges when certain of said bosses are closed.

In testimony whereof I have signed this specification.

CHARLES C. HANSEN.